United States Patent
Smith

(10) Patent No.: US 10,989,103 B2
(45) Date of Patent: *Apr. 27, 2021

(54) SYSTEMS AND METHODS FOR AUTOMATICALLY MONITORING AND CONTROLLING TEMPERATURE FOR A VEHICLE

(71) Applicant: PACCAR Inc, Bellvue, WA (US)

(72) Inventor: Brendan A. Smith, Bellevue, WA (US)

(73) Assignee: PACCAR INC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,162

(22) Filed: Oct. 30, 2019

(65) Prior Publication Data

US 2020/0165959 A1    May 28, 2020

Related U.S. Application Data

(63) Continuation of application No. 15/926,448, filed on Mar. 20, 2018, now Pat. No. 10,487,719.

(Continued)

(51) Int. Cl.
*F01P 11/20* (2006.01)
*F02N 19/02* (2010.01)
(Continued)

(52) U.S. Cl.
CPC .............. *F01P 11/20* (2013.01); *F02B 3/06* (2013.01); *F02D 41/064* (2013.01);
(Continued)

(58) Field of Classification Search
CPC ...... F01P 11/20; F02D 41/064; F02D 41/068; F02D 2200/023; F02D 2200/0606;
(Continued)

(56) References Cited

U.S. PATENT DOCUMENTS

| 3,942,024 A | 3/1976 | Ingham |
| 4,192,274 A * | 3/1980 | Damon ................... F02N 19/10 123/142.5 R |

(Continued)

FOREIGN PATENT DOCUMENTS

| EP | 1348895 | 1/2003 |
| JP | 2008-215332 | 9/2008 |

(Continued)

OTHER PUBLICATIONS

Extended European Search Report dated Aug. 2, 2018, issued in corresponding European Application No. 18163044.3, filed Mar. 21, 2018, 6 pages.

(Continued)

*Primary Examiner* — Erick R Solis

(57) ABSTRACT

In some embodiments, a vehicle includes a temperature monitoring controller. The temperature monitoring controller is a processor, control module, or other suitable hardware that is configured to receive temperature sensor values from an engine control module (ECM) when an ignition bus is in a powered on state, and to decide when the engine should be automatically started in order to maintain a temperature above a low temperature threshold. The temperature monitoring controller periodically causes an ignition bus of the vehicle to be placed in the powered on state when the engine is shut down in order to collect temperature sensor values. The temperature monitoring controller determines whether to automatically start the engine, and if not, determines how long to wait before collecting temperature sensor values again based on a rate of change of the temperature sensor values.

20 Claims, 4 Drawing Sheets

Related U.S. Application Data

(60) Provisional application No. 62/474,479, filed on Mar. 21, 2017.

(51) Int. Cl.
*F02D 41/06* (2006.01)
*F02N 11/08* (2006.01)
*F02B 3/06* (2006.01)

(52) U.S. Cl.
CPC ........ *F02D 41/068* (2013.01); *F02N 11/0803* (2013.01); *F02N 11/0811* (2013.01); *F02N 11/0825* (2013.01); *F02N 11/0829* (2013.01); *F02N 19/02* (2013.01); *F02D 2200/023* (2013.01); *F02D 2200/0608* (2013.01); *F02N 2200/023* (2013.01); *F02N 2200/024* (2013.01); *F02N 2200/122* (2013.01); *F02N 2300/2011* (2013.01)

(58) Field of Classification Search
CPC ......... F02D 2200/0608; F02N 11/0811; F02N 2200/023; F02N 2200/024
USPC ......... 701/113; 123/142.5 R, 196 AB, 196 S, 123/552, 557
See application file for complete search history.

(56) References Cited

U.S. PATENT DOCUMENTS

| | | |
|---|---|---|
| 4,563,987 A | 1/1986 | Geary |
| 5,063,513 A | 11/1991 | Shank |
| 7,290,517 B2 | 11/2007 | Marchand |
| 10,119,487 B1 * | 11/2018 | Skiles .................... C10G 9/206 |
| 10,138,859 B2 | 11/2018 | Godsall |
| 10,487,719 B2 | 11/2019 | Smith |
| 2002/0189564 A1 | 12/2002 | Biess |
| 2009/0312894 A1 | 12/2009 | Meltser |
| 2018/0106231 A1 | 4/2018 | Aiello |
| 2019/0120196 A1 | 4/2019 | Santoro |

FOREIGN PATENT DOCUMENTS

| | | |
|---|---|---|
| KR | 10-2013-0013176 | 2/2013 |
| WO | 2015/162351 | 10/2015 |

OTHER PUBLICATIONS

Extended European Search Report in Application 20169871.9, dated Jul. 31, 2020, 7 pages.

\* cited by examiner

SYSTEMS AND METHODS FOR AUTOMATICALLY MONITORING AND CONTROLLING TEMPERATURE FOR A VEHICLE

CROSS-REFERENCE TO RELATED APPLICATION

This application is a continuation of application Ser. No. 15/926,448, filed Mar. 20, 2018, which claims the benefit of Provisional Application No. 62/474,479, filed Mar. 21, 2017, the entire disclosures of which are hereby incorporated by reference herein for all purposes.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a vehicle configured to automatically manage temperature is provided. The vehicle comprises a temperature monitoring controller, an oil temperature sensor, and a diesel engine. The temperature monitoring controller is configured to obtain a current oil temperature value from the oil temperature sensor; determine an interval time representing a time period after which an oil temperature is predicted to drop below a low temperature threshold, wherein the determination is based on at least a previous interval time, a previous oil temperature value, and the current oil temperature value; in response to determining that the interval time is greater than a threshold interval time, wait for the interval time before obtaining a subsequent oil temperature value from the oil temperature sensor; and in response to determining that the interval time is not greater than the threshold interval time, cause the engine of the vehicle to be started.

In some embodiments, a method of automatically managing temperature in a vehicle is provided. A temperature monitoring controller obtains a current oil temperature value from an oil temperature sensor. The temperature monitoring controller determines an interval time representing a time period after which an oil temperature is predicted to drop below a low temperature threshold, wherein the determination is based on at least a previous interval time, a previous oil temperature value, and the current oil temperature value. In response to determining that the interval time is greater than a threshold interval time, the temperature monitoring controller waits for the interval time before obtaining a subsequent oil temperature value from the oil temperature sensor. In response to determining that the interval time is not greater than the threshold interval time, the temperature monitoring controller causes an engine of the vehicle to be started.

In some embodiments, a non-transitory computer-readable medium having computer-executable instructions stored thereon is provided. In response to execution by at least one processor in a vehicle, the instructions cause the vehicle to perform actions for automatically managing temperature in the vehicle. The actions include obtaining, by a temperature monitoring controller of the vehicle, a current oil temperature value from an oil temperature sensor; determining, by the temperature monitoring controller, an interval time representing a time period after which an oil temperature is predicted to drop below a low temperature threshold, wherein the determination is based on at least a previous interval time, a previous oil temperature value, and the current oil temperature value; in response to determining that the interval time is greater than a threshold interval time, waiting, by the temperature monitoring controller, for the interval time before obtaining a subsequent oil temperature value from the oil temperature sensor; and in response to determining that the interval time is not greater than the threshold interval time, causing, by the temperature monitoring controller, an engine of the vehicle to be started.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
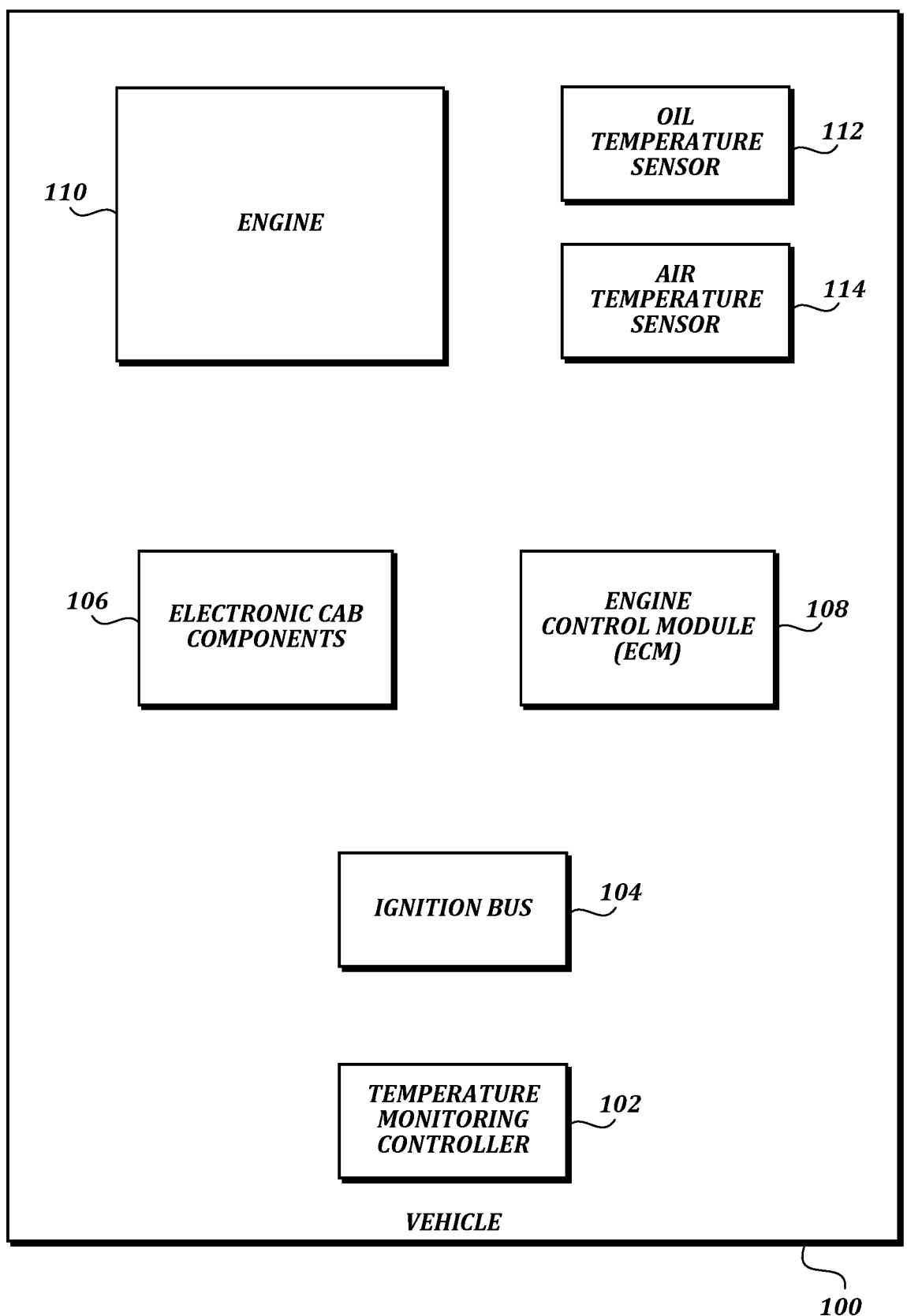
FIG. 1 is a block diagram that illustrates a non-limiting example embodiment of a vehicle according to various aspects of the present disclosure.

FIG. 1 is a block diagram that illustrates a non-limiting example embodiment of a vehicle according to various aspects of the present disclosure. In some embodiments, the vehicle 100 uses diesel fuel. In some embodiments, the vehicle 100 is a Class 8 truck. In some embodiments, the vehicle 100 may be any type of vehicle for which a minimum temperature must be maintained at all times in order to ensure operability. As shown, the vehicle 100 includes an engine 110, an oil temperature sensor 112, an air temperature sensor 114, one or more electronic cab components 106, an engine control module (ECM) 108, an ignition bus 104, and a temperature monitoring controller 102. A typical vehicle 100 will contain many more components known to one of ordinary skill in the art, but which are not illustrated or described herein for the sake of clarity.

In some embodiments, the engine 110 is an internal combustion engine. In some embodiments, the engine 110 is configured to be powered by a diesel fuel blend. In some embodiments, the ECM 108 is configured to control various aspects of the engine 110 while operating, including but not limited to ignition timing, idle speed, and air/fuel ratio. To support these actions, the ECM 108 receives data from a plurality of sensors, including the oil temperature sensor 112 and the air temperature sensor 114. The oil temperature sensor 112 is configured to measure a temperature of oil in the engine 110, an oil reservoir, or elsewhere in the vehicle 100. The oil temperature sensor 112 is configured to generate oil temperature values and provide them to the ECM 108. The air temperature sensor 114 is configured to measure an ambient temperature outside of the vehicle 100. Like the oil temperature sensor 112, the air temperature sensor 114 is configured to generate air temperature values and provide them to the ECM 108. In some embodiments, the electronic cab components 106 are one or more devices within a cab of the vehicle 100. The electronic cab components 106 may include, but are not limited to, lights, warning indicator displays, audible alarms/alerts, and blower fans.

In some embodiments, the ignition bus 104 controls whether various other components of the vehicle 100 receive electrical power. For example, in some embodiments, when the ignition bus 104 is in a powered off state, the electronic cab components 106 and ECM 108 do not receive electrical power (or, at least, do not receive enough electrical power to provide functionality). Meanwhile, when the ignition bus 104 is in a powered on state, the engine 110, electronic cab components 106, and ECM 108 receive power. If a starter is engaged while the ignition bus 104 is in the powered on state, the engine 110 may start, and the ignition bus 104 must be in the powered on state for the engine 110 to run. However, the ignition bus 104 may be in the powered on state without the engine 110 starting. In some embodiments, one or more of the electronic cab components 106 may be activated upon receiving power from the ignition bus 104, and may not be configurable to remain deactivated if power is received.

In diesel vehicles such as Class 8 trucks, a technical problem exists in that the fuel experiences "gelling" at low temperatures. One technique for avoiding gelling is to run the engine 110 in order to maintain fuel temperature above a low temperature threshold. However, running the engine 110 constantly wastes fuel and pollutes the environment, particularly when the vehicle 100 will be stationary for long periods of time (such as when an operator of the vehicle 100 is resting overnight in a truck sleeper). In such situations, the engine 110 instead may be shut down and automatically restarted periodically in order to maintain the fuel temperature above the low temperature threshold.

It would be advantageous to only restart the engine 110 when needed to maintain temperature, because fuel could be conserved and pollution could be reduced. However, several technical problems exist in doing so within existing vehicle 100 configurations. For example, in some embodiments, the ECM 108 is only active to receive sensor values if it is receiving power from the ignition bus 104. This leads to a problem, in that the ignition bus 104 must be powered on in order to receive sensor values to check if the engine 110 should be automatically started. As stated above, if the ignition bus 104 is in the powered on state, at least some of the electronic cab components 106 will also be powered on. If the operator is trying to sleep in the truck sleeper, powering on the electronic cab components 106 will disturb the operator. This can lead to the operator receiving less rest (and the corresponding detriment to safety), or to the operator disabling the auto start feature and simply not turning off the engine 110 while resting (and the corresponding waste of fuel and increased pollution).

While a predetermined interval could be used to check temperature (e.g., place the ignition bus 104 in the powered on state every 10 minutes to check the temperature), this is undesirable for multiple reasons. For example, if the predetermined interval is set too short, the ignition bus 104 will be powered on unnecessarily. As another example, if the predetermined interval is set too long, the fuel temperature may fall below the gelling temperature before the auto-start can be engaged. What is desirable is a controller that can monitor the temperature in such a way that increases the interval time between the powering on of the ignition bus 104 when possible, but that also can ensure that the temperature will be checked before it crosses the low temperature threshold. What is also desirable is a controller that can provide such functionality without having to retrofit a vehicle 100 to include additional sensors that can be used without powering on the ignition bus 104.

To provide these (and other) advantages, the vehicle 100 includes a temperature monitoring controller 102. In some embodiments, the temperature monitoring controller 102 is a processor, control module, or other suitable hardware that is configured to receive sensor values from the ECM 108 and to decide when the engine 110 should be automatically started. In some embodiments, the temperature monitoring controller 102 is powered separately from the ignition bus 104, and so can operate even when the ignition bus 104 is in the powered off state. In some embodiments, the temperature monitoring controller 102 may be incorporated into a portion of the ECM 108 that receives power even while the ignition bus 104 is in the powered off state. In some embodiments, when the temperature monitoring controller 102 determines that the engine 110 should be automatically started in order to maintain temperature, the temperature monitoring controller 102 can cause the engine 110 to be started using any suitable technique, including but not limited to engaging a starter and transmitting an instruction or other signal to the ECM 108. Further details of how the temperature monitoring controller 102 decides when to automatically start the engine 110 and when to place the ignition bus 104 in the powered on state are provided below.

Figure 2A:
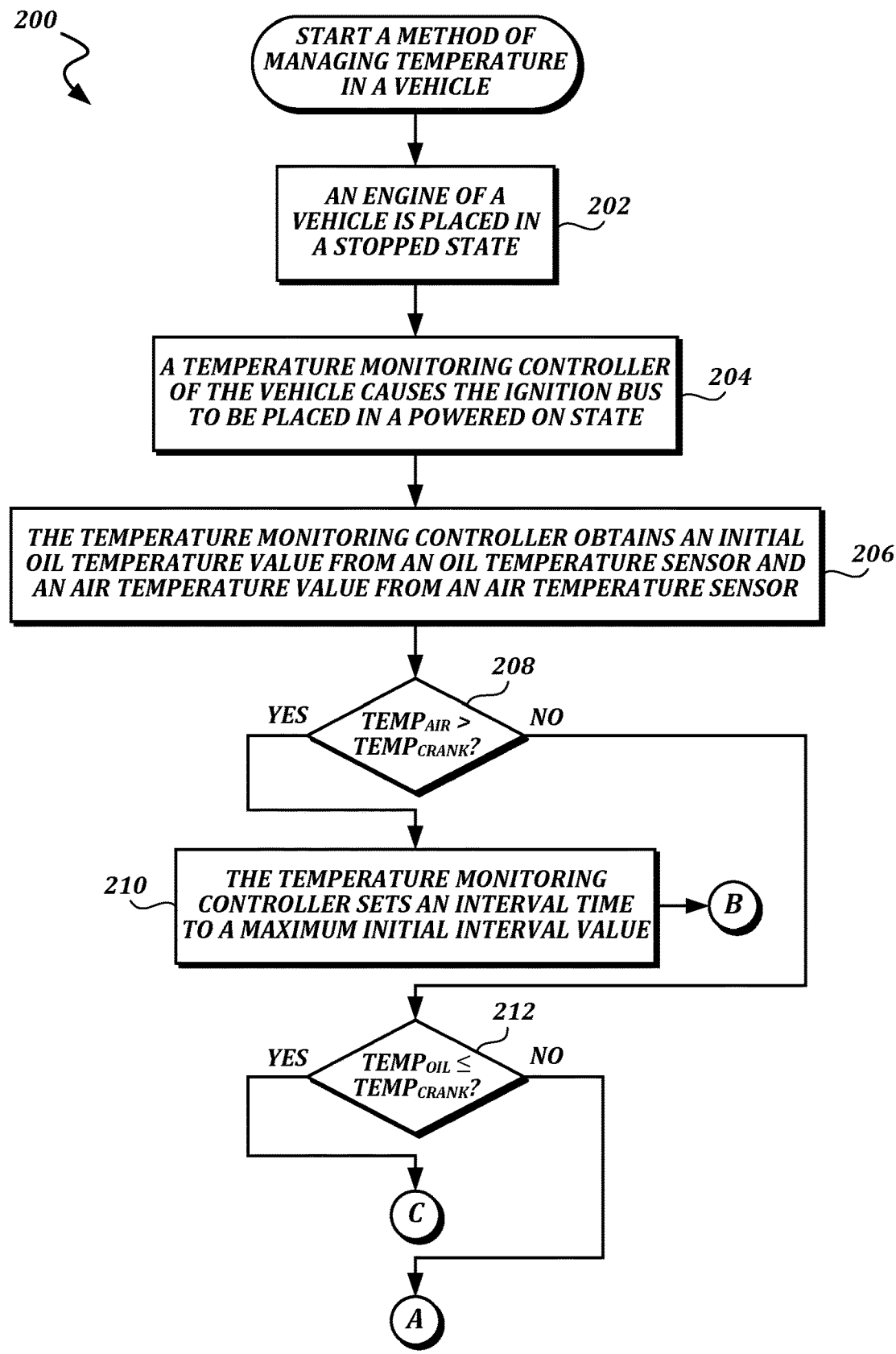
FIGS. 2A-2B are a flowchart that illustrates a non-limiting example embodiment of a method of managing temperature in a vehicle according to various aspects of the present disclosure.
Figure 2B:
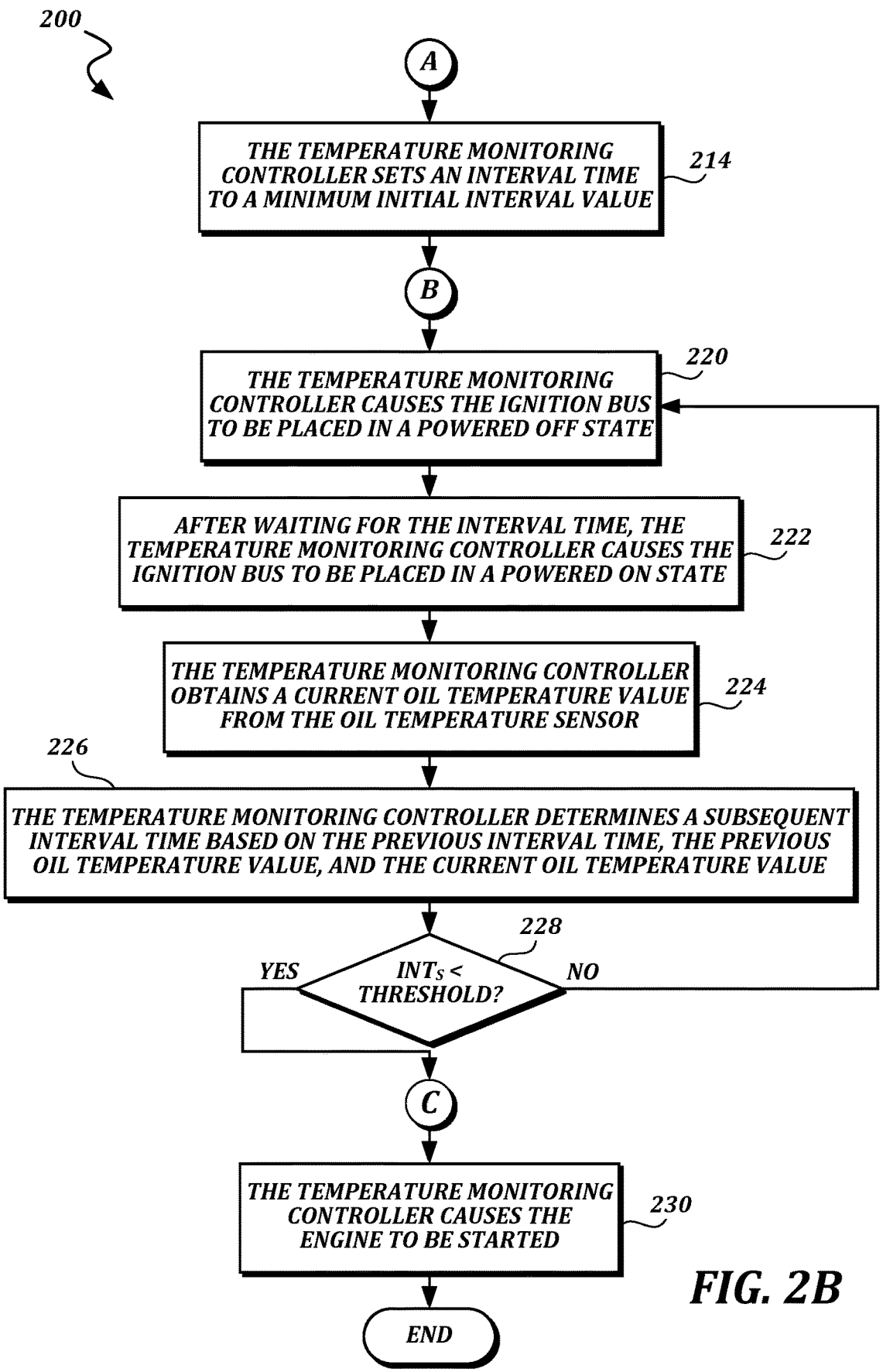

FIGS. 2A-2B are a flowchart that illustrates a non-limiting example embodiment of a method of managing temperature in a vehicle according to various aspects of the present disclosure. From a start block, the method 200 proceeds to block 202, where an engine 110 of a vehicle 100 is placed in a stopped state. Placing the engine 110 in the stopped state may include placing the ignition bus 104 in the powered off state. Next, at block 204, a temperature monitoring controller 102 of the vehicle 100 causes the ignition bus 104 to be placed in a powered on state (assuming it was previously in the powered off state). With the ignition bus 104 in the powered on state, the temperature monitoring controller 102 can request sensor values from the ECM 108.

At block 206, the temperature monitoring controller 102 obtains an initial oil temperature value from an oil temperature sensor 112 and an air temperature value from an air temperature sensor 114. As noted above, the values may be obtained from the ECM 108, as opposed to directly from the sensors. In some embodiments, the temperature monitoring controller 102 may be able to receive the values directly from the sensors, but ignition bus power is still needed to activate the sensors. It should also be noted that in the illustrated and described embodiments, the temperature monitoring controller 102 is using oil temperature as a proxy for fuel temperature, at least because the oil temperature sensor 112 is widely installed and available. In other embodiments, other values may be used to determine the fuel temperature, such as a different proxy value, or a direct measurement of the fuel temperature itself.

A test is then performed to determine whether the air temperature value is greater than a low temperature threshold. As known to one of ordinary skill in the art, the oil temperature will generally be warmer than the ambient temperature when the engine 110 is running, and will decay to the ambient temperature when the engine 110 is not running. If the air temperature is greater than the low temperature threshold, then it is unlikely that oil temperature will drop below the low temperature threshold (though it is advisable to continue to check, in case the ambient temperature falls). The low temperature threshold is temperature value below which engine may have reliability problems, including but not limited to fuel gelling.

In some embodiments, the low temperature threshold may be configured by the vehicle operator. Since the illustrated method 200 is intended to make sure that the fuel does not fall below its gelling temperature, the vehicle operator may set the low temperature threshold based on a gelling temperature of a particular fuel blend being used. In some embodiments, the vehicle 100 may provide an interface that allows the vehicle operator to directly enter the low temperature threshold. In some embodiments, the vehicle 100 may be programmed with low temperature thresholds for various fuel blends, and the vehicle operator may select a fuel blend in order to configure the low temperature threshold. In some embodiments, the vehicle operator may base the low temperature threshold on the gelling temperature of the fuel blend plus an offset, for safety. In the flowchart, the low temperature threshold is illustrated as $\text{TEMP}_{CRANK}$.

If the test determined that the air temperature value is greater than the low temperature threshold, then the result of the determination at decision block 208 is YES, and the method 200 proceeds to block 210. The illustrated embodiment describes this test as "greater than," though in some embodiments, the test may instead determine whether the air temperature value is greater than or equal to the low temperature threshold.

At block 210, the temperature monitoring controller 102 sets an interval time to a maximum initial interval value. One example maximum initial interval value is any value between 30 minutes and 90 minutes, such as 60 minutes. Because the oil temperature value is unlikely to ever reach the low temperature threshold if the air temperature value is above the low temperature threshold, the maximum initial interval value can be set to a high value to reduce intrusiveness. In some embodiments, the maximum initial interval value may be set to a given value (instead of to an infinite value or no value) so that it remains unlikely that the temperature will fall without the temperature monitoring controller 102 reacting at all. In some embodiments, the maximum initial interval value may be configured by the vehicle operator. The method 200 then proceeds to a continuation terminal ("terminal B").

Otherwise, if the test determined that the air temperature value is not greater than the low temperature threshold, then the result of the determination at decision block 208 is NO, and the method 200 proceeds to perform a test to determine whether the oil temperature value is less than or equal to the low temperature threshold. If the test determined that the oil temperature is less than or equal to the low temperature threshold, then the result of the determination at decision block 212 is YES, and the method 200 proceeds to a continuation terminal ("terminal C"). In some embodiments, the low temperature threshold would be set by the vehicle operator to be higher than the gelling temperature of the fuel blend, since reaching the gelling temperature would be too late. Since the method 200 would be at block 204 soon after the engine 110 was turned off (and the engine 110 was successfully running before then), the oil temperature value would likely be between the gelling temperature of the fuel blend and the low temperature threshold due to the offset provided by the vehicle operator if the method 200 has reached a point where result of the determination at decision block 212 is YES. Again, as above, though the illustrated embodiment describes this determination as "less than or equal to," in some embodiments, this determination may be "less than."

Otherwise, if the oil temperature value is not less than or equal to the low temperature threshold, then the result of the determination at decision block 212 is NO, and the method 200 proceeds to another continuation terminal ("terminal A"). From terminal A (FIG. 2B), the method 200 proceeds to block 214, where the temperature monitoring controller 102 sets an interval time to a minimum initial interval value. One example minimum initial interval value is any value between one minute and twenty minutes, such as ten minutes. The minimum initial interval value may be selected to be short enough to reduce the risk of a significant temperature drop, but while remaining large enough to provide a meaningful difference between the oil temperature value at the start of the interval and at the end of the interval such that a rate of change may be determined. In some embodiments, the minimum initial interval value may be configured by the vehicle operator.

The method 200 then proceeds to terminal B, and then to block 220, where the temperature monitoring controller 102 causes the ignition bus 104 to be placed in a powered off state. As described above, while the ignition bus 104 is in the powered off state, the electronic cab components 106, the ECM 108, and the sensors 112, 114 will not be active.

Next, the temperature monitoring controller 102 waits for the interval time. One of ordinary skill in the art will recognize that blocks 220-226 of the method 200 constitute a loop. The first time through the loop, the interval time will be either the maximum initial interval time assigned in block 210, or the minimum initial interval time assigned in block 214. For example, if the interval time was set to a minimum initial interval value of ten minutes, then the temperature monitoring controller 102 waits for ten minutes before the method 200 proceeds. On subsequent times through the loop (if any), the interval time will be the time determined in block 224 as described below.

At block 222, after waiting for the interval time, the temperature monitoring controller 102 causes the ignition bus 104 to be placed in a powered on state. In the powered on state, power is supplied to the ECM 108, and therefore values may be obtained from the sensors 112, 114. As a side-effect, power is also supplied to the electronic cab components 106, which may cause them to flash lights, sound alerts, activate blowers, and so on. In some embodiments, power may be withheld from one or more of the electronic cab components 106 when the ignition bus 104 is placed in the powered on state, if possible.

Next, at block 224, the temperature monitoring controller 102 obtains a current oil temperature value from the oil temperature sensor 112. As described above, the value may be obtained via the ECM 108, or directly from the oil temperature sensor 112. At block 226, the temperature monitoring controller 102 determines a subsequent interval time based on the previous interval time, the previous oil temperature value, and the current oil temperature value. For the time through the loop of blocks 220-228, the previous interval time will be the initial interval time, and the previous oil temperature value will be the initial oil temperature value. For subsequent times through the loop of blocks 220-228, if any, the current oil temperature value and the subsequent interval time will be used.

In some embodiments, the rate of change of the oil temperature is used to predict the future time at which the oil temperature will reach the low temperature threshold. Oil temperature experiences exponential decay when exposed to a lower ambient temperature, and so the rate of change observed between any two discrete oil temperature readings will be a conservative estimate of the time, thus increasing the likelihood that the engine 110 will be automatically started before reaching the low temperature threshold while allowing for increased interval times when appropriate.

In some embodiments, the subsequent interval time may be determined using a formula similar to the following:

$$T = \frac{(TEMP_{CRANK} - TEMP_C) * INT_C}{TEMP_C - TEMP_P}$$

where:

T: Subsequent interval time (in minutes)
$TEMP_{CRANK}$: low temperature threshold (in degrees)
$TEMP_C$: current oil temperature (in degrees)
$TEMP_p$: previous oil temperature (in degrees)
$INT_C$: previous/current interval time (in minutes)

In some embodiments, other formulas may be used that predict the time at which the current oil temperature will reach the low temperature threshold. For example, instead of using a conservative linear model for the prediction, an exponential decay model may be used in order to more accurately predict the point when the low temperature threshold may be reached.

Once the subsequent interval time is determined, a test is performed to determine whether the subsequent interval time is lower than a threshold interval time. In some embodiments, the threshold interval time may be selected based on an interval time that would be too short to provide relief to the vehicle operator. In other words, the threshold interval time would be set to a point at which, if the electronic cab components 106 were activated that frequently, it would be likely to disturb the vehicle operator. In some embodiments, the threshold interval time may be configured by the vehicle operator. In some embodiments, the threshold interval time may be any suitable value, such as between one minute and twenty minutes. One such value is ten minutes. In some embodiments, the threshold interval time may be set equal to the minimum initial interval value. In some embodiments, the threshold interval time should be set lower than or equal to the minimum initial interval value.

In some embodiments, the temperature monitoring controller 102 could check the oil temperature value to determine if it is at or below the low temperature threshold (or within an offset of the low temperature threshold), instead of using the subsequent interval time as a proxy for the low temperature threshold. However, using the interval time threshold provides a benefit, in that it avoids rapid cycling of the ignition bus when approaching the low temperature threshold.

If the test has determined that the subsequent interval time is greater than or equal to the threshold interval time, then the result of the determination at decision block 228 is NO, and the method 200 returns to block 220. In the next pass through the loop of blocks 220-226, the subsequent interval time determined in block 226 is used as the new interval time. In some embodiments, the subsequent interval time may be limited by a ceiling such as the maximum initial interval value.

Otherwise, if the test has determined that the subsequent interval time is lower than a threshold interval time, then the result of the determination at decision block 228 is YES, and the method 200 proceeds to terminal C, and then to block 230, where the temperature monitoring controller 102 causes the engine 110 to be automatically started. The engine 110 will then run to bring the vehicle 100 up to an acceptable temperature. In some embodiments, the engine 110 may run for a predetermined amount of time. In some embodiments, the engine 110 may run until the oil temperature reaches a high temperature threshold. In some embodiments, the engine 110 may run for any other suitable amount of time.

The method 200 then proceeds to an end block and terminates.

In some embodiments, the method 200 may be executed multiple times while vehicle 100 is otherwise off. For example, a vehicle 100 may auto-start multiple times while parked over the course of a night if the ambient temperature is particularly cold, and may be auto-stopped at any suitable time. Each time the engine 120 stops, the method 200 may be re-executed.

In some embodiments, the vehicle 100 may be configured to enable or disable functionality of the method 200. For example, if the air temperature is higher than a given threshold, or it is a given season and/or location (e.g., if the vehicle is in Texas in July, and/or the ambient temperature is 80 degrees F.), the vehicle 100 may not perform the method 200 at all, but may instead leave the engine off with no fear of reaching the low temperature threshold. In some embodiments, the vehicle 100 may determine this automatically using GPS and the average seasonal temperature of the location. In some embodiments, the functionality may be enabled or disabled by the vehicle operator.

Figure 3:
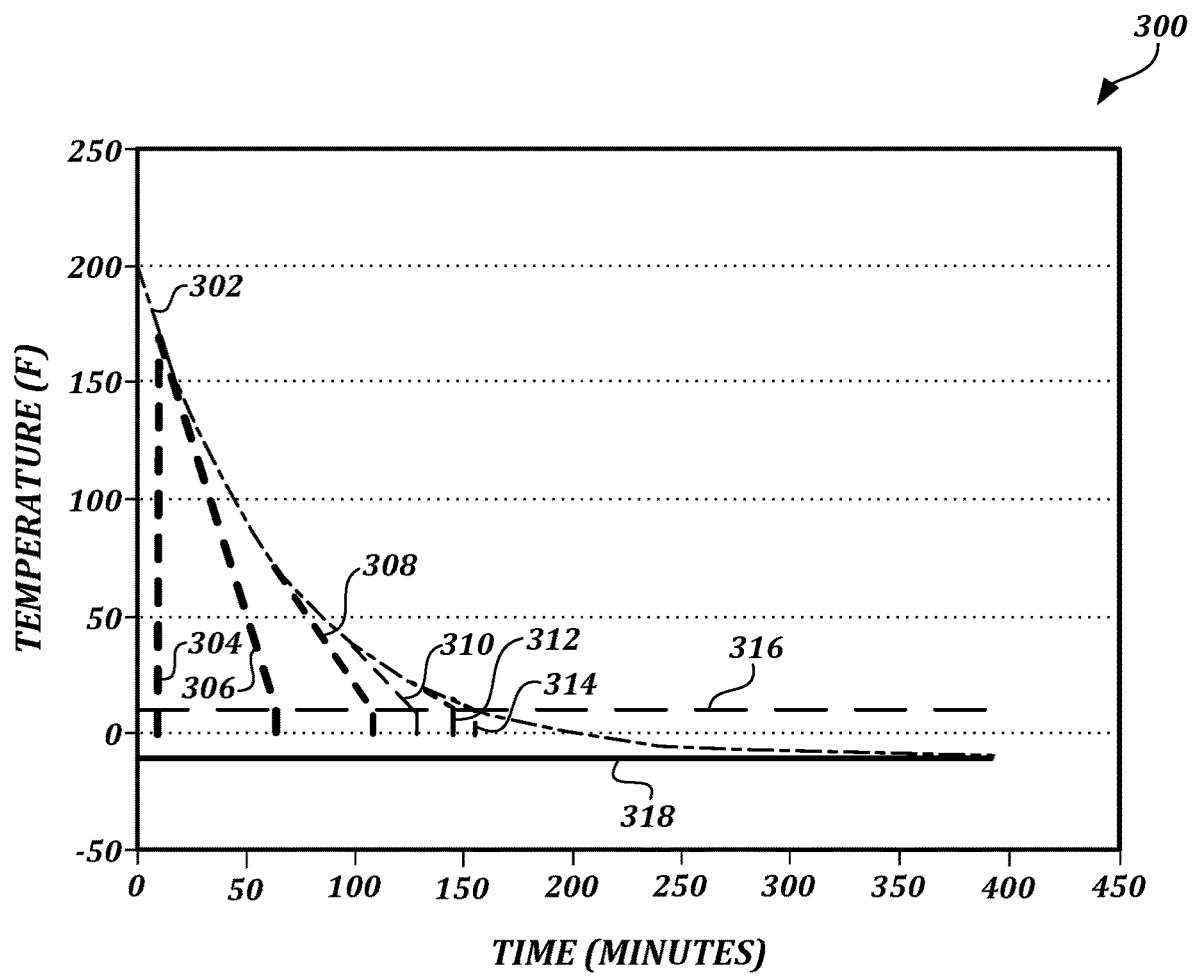
FIG. 3 is a chart that illustrates a non-limiting example of a temperature curve over time to illustrate the calculations performed according to various aspects of the present disclosure.

FIG. 3 is a chart that illustrates a non-limiting example of a temperature curve over time to illustrate the calculations performed according to various aspects of the present disclosure. In the chart 300, the X-axis represents time (in minutes), and the Y-axis represents temperature (in degrees Fahrenheit). The curved line 302 is an example of oil temperature over time. At time=0, the oil temperature starts at 200° and exhibits exponential decay over time. The horizontal line at −10° illustrates an example of air temperature 318. The horizontal line at +10° illustrates an example low temperature threshold 316. The values are illustrative only and are used to illustrate the result of the computations. Real world values may vary, as oil temperature may be different, rate of decay may be different, low temperature threshold may be lower or higher, and ambient temperatures may vary (and may not be constant).

In the chart 300, time=0 indicates the state at block 206 of the method 200, and at block 214, a minimum initial interval value of 10 minutes was set. The dashed line 304 at time=10 indicates the state at block 224, where a current oil temperature is measured as approximately 170°. The previous oil temperature was 200°, and the previous interval time was 10 minutes. Accordingly, the computation at block 224 resulted in a subsequent interval time of 54 minutes.

The dashed line 306 at time=64 (54 minutes after time=10) indicates the state at block 224 again, where a current oil temperature is measured as approximately 70°. The previous oil temperature was 170°, and the previous interval time was 54 minutes. Accordingly, the computation at block 224 resulted in a subsequent interval time of 32 minutes.

The dashed line 308 at time=96 (32 minutes after time=64) indicates the state at block 224 again, where a current oil temperature is measured as approximately 40°. The previous oil temperature was 70°, and the previous interval time was 32 minutes. Accordingly, the computation at block 224 resulted in a subsequent interval time of 31 minutes.

The dashed line 310 at time=127 (31 minutes after time=96) indicates the state at block 224 again, where a current oil temperature is measured as approximately 21°. The previous oil temperature was 40°, and the previous interval time was 31 minutes. Accordingly, the computation at block 224 resulted in a subsequent interval time of 18 minutes.

The dashed line 312 at time 145 (18 minutes after time=127) indicates the state at block 224 again, where a current oil temperature is measured as approximately 14°. The previous oil temperature was 21°, and the previous interval time was 18 minutes. Accordingly, the computation at block 224 resulted in a subsequent interval time of 9 minutes.

The dashed line 314 at time 154 (9 minutes after time=145) indicates a point where the oil temperature 302 reached the low temperature threshold. If the threshold interval time had been set to 10 minutes, the engine 110 would have been automatically started at time=145, when the subsequent interval time was computed to be less than the threshold interval time. One will notice that the first computed interval time was 54 minutes, and the last computed interval time greater than the threshold was 18 minutes, for an average interval time of 33.75 minutes.

One of ordinary skill in the art will recognize that the above general techniques will result in different behavior for different values. For example, if the ambient temperature is much closer to the low temperature threshold, the computed intervals will be longer on average because the oil temperature will approach the low temperature threshold more slowly. Also, if the ambient temperature is lower, or if the starting oil temperature is lower, then the computed intervals will be shorter on average.

While the preferred embodiment of the invention has been illustrated and described, it will be appreciated that various changes can be made therein without departing from the spirit and scope of the invention.

The invention claimed is:

1. A vehicle configured to automatically manage temperature, comprising:
    a temperature monitoring controller;
    a fluid temperature sensor; and
    an engine;
    wherein the temperature monitoring controller is configured to:
        obtain a current fluid temperature value for a fluid from the fluid temperature sensor;
        determine an interval time representing a time period after which a fluid temperature is predicted to drop below a low temperature threshold, wherein the determination is based on at least a previous interval time, a previous fluid temperature value, and the current fluid temperature value;
        in response to determining that the interval time is greater than a threshold interval time, wait for the interval time before obtaining a subsequent fluid temperature value from the fluid temperature sensor; and
        in response to determining that the interval time is not greater than the threshold interval time, cause the engine of the vehicle to be started.

2. The vehicle of claim 1, wherein obtaining a current fluid temperature value from an fluid temperature sensor comprises powering on an ignition bus of the vehicle.

3. The vehicle of claim 1, wherein the temperature monitoring controller is further configured to, in response to determining that the interval time is greater than the threshold interval time, power off an ignition bus of the vehicle.

4. The vehicle of claim 1, wherein the temperature monitoring controller is further configured to determine an initial interval time, wherein determining the initial interval time comprises:
    obtaining an initial fluid temperature value from the fluid temperature sensor and an air temperature value from an air temperature sensor;
    determining whether the air temperature value is greater than the low temperature threshold;
    in response to determining that the air temperature value is greater than the low temperature threshold, setting the initial interval time to a predetermined maximum initial interval value; and
    in response to determining that the air temperature value is not greater than the low temperature threshold:
        determining whether the initial fluid temperature value is less than the low temperature threshold;
        in response to determining that the initial fluid temperature value is less than the low temperature threshold, causing the engine of the vehicle to be started; and
        in response to determining that the initial fluid temperature value is not less than the low temperature threshold, setting the initial interval time to a predetermined minimum initial interval value.

5. The vehicle of claim 1, wherein determining the interval time representing a time at which a fluid temperature is predicted to drop below a low temperature threshold based on at least a previous interval time, a previous fluid temperature value, and the current fluid temperature value comprises:
    multiplying a difference between the current fluid temperature value and the low temperature threshold by the previous interval time to obtain a first result;
    determining a difference between the current fluid temperature value and the previous fluid temperature value to obtain a second result; and
    dividing the first result by the second result to obtain the interval time.

6. The vehicle of claim 5, wherein the temperature monitoring controller is further configured to set the interval time to a predetermined maximum interval time in response to determining that the interval time obtained by dividing the first result by the second result is greater than the predetermined maximum interval time.

7. The vehicle of claim 1, wherein the low temperature threshold is configurable by an operator of the vehicle based on a fuel blend.

8. The vehicle of claim 1, wherein the fluid is fuel for the vehicle.

9. A method of automatically managing temperature in a vehicle, the method comprising:
    obtaining, by a temperature monitoring controller, a current fluid temperature value for a fluid from a fluid temperature sensor;
    determining, by the temperature monitoring controller, an interval time representing a time period after which a fluid temperature is predicted to drop below a low temperature threshold, wherein the determination is based on at least a previous interval time, a previous fluid temperature value, and the current fluid temperature value;
    in response to determining that the interval time is greater than a threshold interval time, waiting, by the temperature monitoring controller, for the interval time before obtaining a subsequent fluid temperature value from the fluid temperature sensor; and in response to determining that the interval time is not greater than the threshold interval time, causing, by the temperature monitoring controller, an engine of the vehicle to be started.

10. The method of claim 9, further comprising determining, by the temperature monitoring controller, an initial interval time, wherein determining the initial interval time comprises:
   obtaining, by the temperature monitoring controller, an initial fluid temperature value from a fluid temperature sensor and an air temperature value from an air temperature sensor;
   determining whether the air temperature value is greater than the low temperature threshold;
   in response to determining that the air temperature value is greater than the low temperature threshold, setting the initial interval time to a predetermined maximum initial interval value; and
   in response to determining that the air temperature value is not greater than the low temperature threshold:
      determining whether the initial fluid temperature value is less than the low temperature threshold;
      in response to determining that the initial fluid temperature value is less than the low temperature threshold, causing the engine of the vehicle to be started; and
      in response to determining that the initial fluid temperature value is not less than the low temperature threshold, setting the initial interval time to a predetermined minimum initial interval value.

11. The method of claim 9, wherein determining the interval time representing a time at which a fluid temperature is predicted to drop below a low temperature threshold based on at least a previous interval time, a previous fluid temperature value, and the current fluid temperature value comprises:
   multiplying a difference between the current fluid temperature value and the low temperature threshold by the previous interval time to obtain a first result;
   determining a difference between the current fluid temperature value and the previous fluid temperature value to obtain a second result; and
   dividing the first result by the second result to obtain the interval time.

12. The method of claim 11, further comprising setting the interval time to a predetermined maximum interval time in response to determining that the interval time obtained by dividing the first result by the second result is greater than the predetermined maximum interval time.

13. The method of claim 9, wherein the fluid is fuel for the vehicle.

14. A non-transitory computer-readable medium having computer-executable instructions stored thereon that, in response to execution by at least one processor in a vehicle, cause the vehicle to perform actions for automatically managing temperature in the vehicle, wherein the actions include:
   obtaining, by a temperature monitoring controller of the vehicle, a current fluid temperature value for a fluid from a fluid temperature sensor;
   determining, by the temperature monitoring controller, an interval time representing a time period after which a fluid temperature is predicted to drop below a low temperature threshold, wherein the determination is based on at least a previous interval time, a previous fluid temperature value, and the current fluid temperature value;
   in response to determining that the interval time is greater than a threshold interval time, waiting, by the temperature monitoring controller, for the interval time before obtaining a subsequent fluid temperature value from the fluid temperature sensor; and
   in response to determining that the interval time is not greater than the threshold interval time, causing, by the temperature monitoring controller, an engine of the vehicle to be started.

15. The computer-readable medium of claim 14, wherein obtaining a current fluid temperature value from a fluid temperature sensor comprises powering on an ignition bus of the vehicle.

16. The computer-readable medium of claim 14, wherein the actions further comprise, in response to determining that the interval time is greater than the threshold interval time, powering off an ignition bus of the vehicle.

17. The computer-readable medium of claim 14, wherein the actions further comprise determining, by the temperature monitoring controller, an initial interval time, wherein determining the initial interval time comprises:
   obtaining, by the temperature monitoring controller, an initial fluid temperature value from a fluid temperature sensor and an air temperature value from an air temperature sensor;
   determining whether the air temperature value is greater than the low temperature threshold;
   in response to determining that the air temperature value is greater than the low temperature threshold, setting the initial interval time to a predetermined maximum initial interval value; and
   in response to determining that the air temperature value is not greater than the low temperature threshold:
      determining whether the initial fluid temperature value is less than the low temperature threshold;
      in response to determining that the initial fluid temperature value is less than the low temperature threshold, causing the engine of the vehicle to be started; and
      in response to determining that the initial fluid temperature value is not less than the low temperature threshold, setting the initial interval time to a predetermined minimum initial interval value.

18. The computer-readable medium of claim 14, wherein determining the interval time representing a time at which a fluid temperature is predicted to drop below a low temperature threshold based on at least a previous interval time, a previous fluid temperature value, and the current fluid temperature value comprises:
   multiplying a difference between the current fluid temperature value and the low temperature threshold by the previous interval time to obtain a first result;
   determining a difference between the current fluid temperature value and the previous fluid temperature value to obtain a second result; and
   dividing the first result by the second result to obtain the interval time.

19. The computer-readable medium of claim 18, wherein the actions further comprise setting the interval time to a predetermined maximum interval time in response to determining that the interval time obtained by dividing the first result by the second result is greater than the predetermined maximum interval time.

20. The computer-readable medium of claim 14, wherein the fluid is fuel for the vehicle.

* * * * *